(12) United States Patent
Hoshikawa

(10) Patent No.: US 6,831,700 B2
(45) Date of Patent: Dec. 14, 2004

(54) VIDEO SIGNAL PROCESSOR

(75) Inventor: Masanori Hoshikawa, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 381 days.

(21) Appl. No.: 09/727,492

(22) Filed: Dec. 4, 2000

(65) Prior Publication Data

US 2001/0028410 A1 Oct. 11, 2001

(30) Foreign Application Priority Data

Dec. 3, 1999 (JP) ............................................ 11-344292

(51) Int. Cl.[7] .................................................. H04N 7/01
(52) U.S. Cl. ........................ 348/446; 348/448; 348/581
(58) Field of Search ................................. 348/581, 446, 348/448, 441, 458, 459, 555, 556, 558, 443, 445; 345/698, 660, 667; 358/1.2; 382/298, 299

(56) References Cited

U.S. PATENT DOCUMENTS

| | | | | |
|---|---|---|---|---|
| 5,517,247 A | * | 5/1996 | Correa et al. ................ | 348/448 |
| 5,610,661 A | * | 3/1997 | Bhatt ........................ | 348/446 |
| 5,841,480 A | * | 11/1998 | Rhodes ....................... | 348/459 |
| 5,963,261 A | * | 10/1999 | Dean .......................... | 348/446 |
| 6,072,457 A | * | 6/2000 | Hashimoto et al. ......... | 345/100 |
| 6,281,933 B1 | * | 8/2001 | Ritter ......................... | 348/447 |
| 6,313,822 B1 | * | 11/2001 | McKay et al. .............. | 345/132 |
| 6,339,434 B1 | * | 1/2002 | West et al. ................. | 345/667 |
| 6,466,272 B1 | * | 10/2002 | Arai et al. .................. | 348/555 |

* cited by examiner

Primary Examiner—Michael H. Lee
Assistant Examiner—Paulos M. Natnael
(74) Attorney, Agent, or Firm—Sughrue Mion, PLLC

(57) ABSTRACT

The present invention provides a video processor which has a simple circuit configuration and can scale up and down image resolution freely. A video signal processor includes a plurality of line memories, each storing one horizontal scanning line of video data series, a controller for controlling writing and reading operations of input video data series in the line memories for every horizontal scanning line, and an arithmetical unit for generating a new horizontal scanning line of video data series based on video data series from two line memories. The controller selects the vertical scaling power of the resolution, and generates a horizontal scanning synchronizing signal having a period depending on the selected scaling power. The arithmetical unit is triggered by the horizontal scanning synchronizing signal and generates a new video data series.

2 Claims, 4 Drawing Sheets

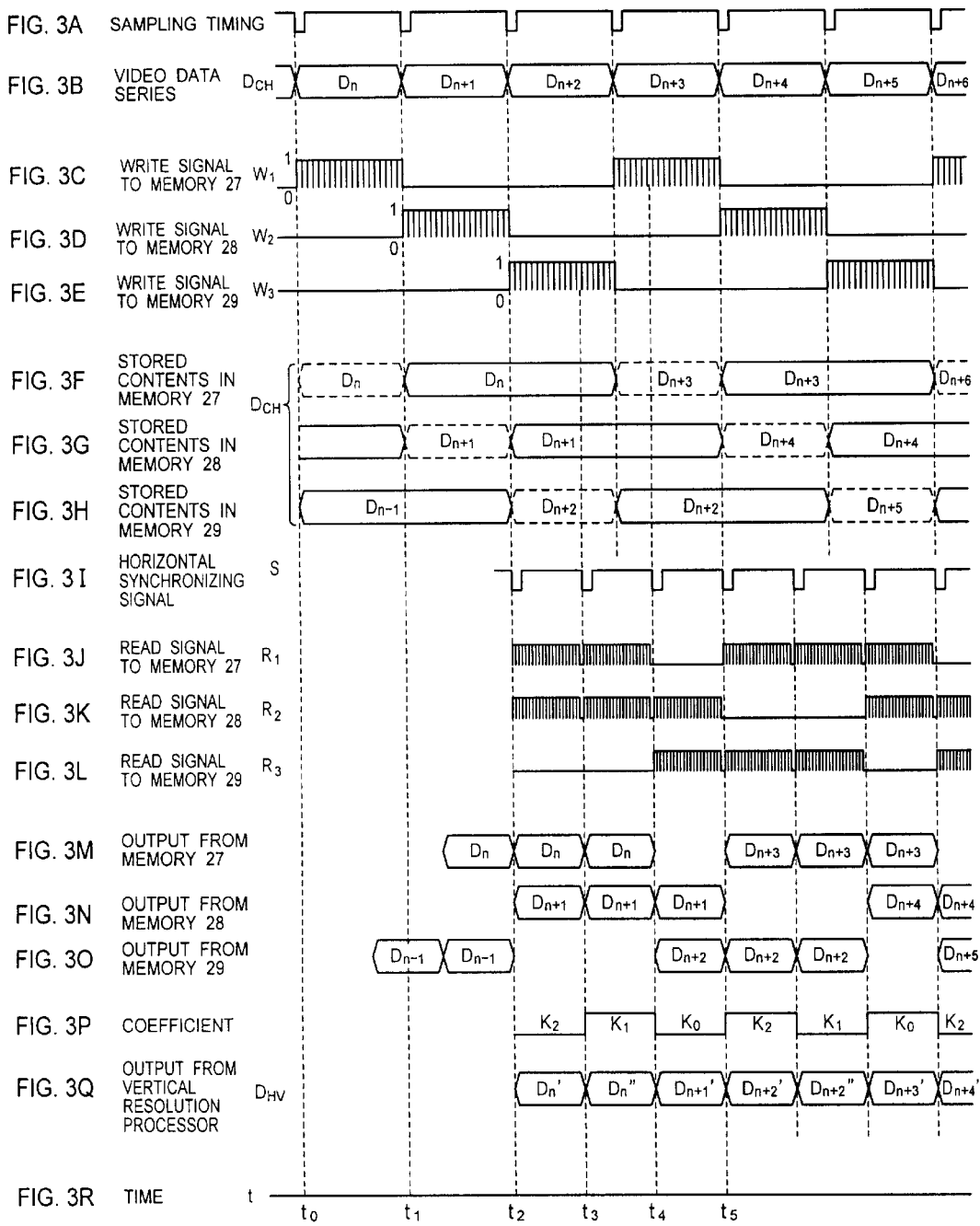

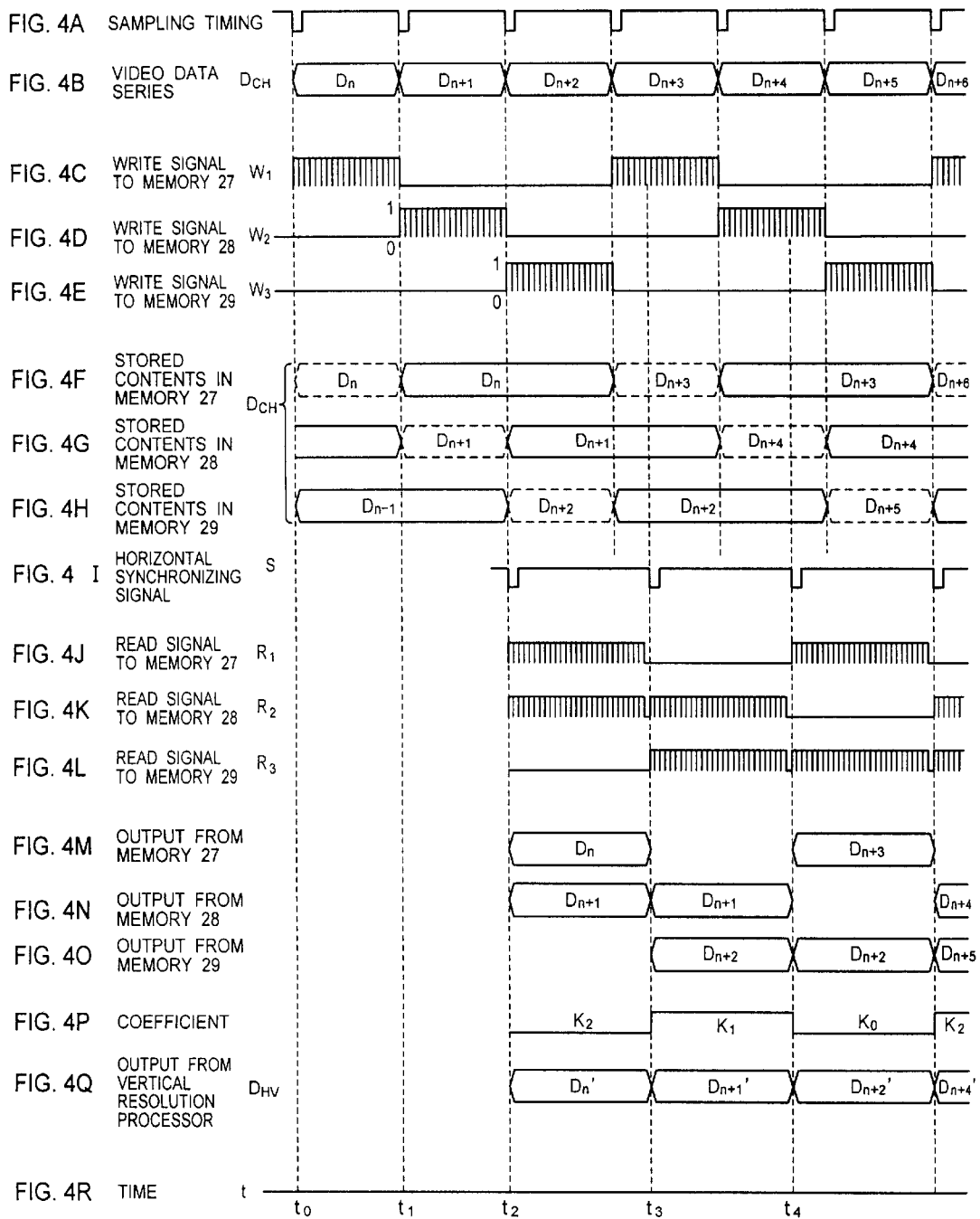

VIDEO SIGNAL PROCESSOR

BACKGROUND OF THE INVENTION

1. Description of Technical Field

The present invention relates to a video signal processor, in particular a resolution processor for artificially increasing the resolution of video data.

2. Related Art

At present, most displays for personal computers are multi-scan displays which are suitable for various display modes having resolutions such as 640 (horizontal)×480 (vertical) dots, 800×600 dots, 1024×768 dots, or 1600×1200 dots. In order to obtain a full-screen display of video data with a resolution of 800×600 dots in a display mode of, for example, 1600×1200 dots, signal processing of doubling the video data both vertically and horizontally is performed to increase the resolution to 1600×1200 dots.

The resolution of a video signal in a television system of the NTSC system is determined when the television system is manufactured. Accordingly, a television receiver which receives video signals in the television system has a resolution corresponding to a video signal. Recently, however, a high-definition television receiver has been produced that enables an image to be displayed with a higher definition than the regulated resolution in the above-mentioned television system by desirably enlarging a video signal in both the vertical and horizontal directions to artificially increase the resolution.

In this manner, the high-definition television receiver and the personal computer change the resolution so as to artificially increase the resolution of a video signal (video data) by enlarging a received video signal by n times both in the vertical and horizontal directions.

FIG. 1 shows a resolution processor which changes the resolution of received video data as described above.

In FIG. 1, the resolution processor comprises a sampling frequency converter 1, a horizontal resolution processor 5, a vertical resolution processor 6, and a resolution processing controller 15.

In the sampling frequency converter 1, a timing detector 3 detects a sampling timing of a video data series D consisting of received video data strings of 8-bit, for example, and supplies a write signal corresponding to the detected timing to a line memory 2. It should be noted that each of the video data corresponds to a pixel of a display unit 14 which is to be described later. The line memory 2 sequentially stores each of the video data in the video data series D in response to a write signal. The line memory 2 further reads out the video data series D stored in the above manner in a receiving order in response to a read signal supplied from the resolution processing controller 15. The line memory 2 supplies the stored data series D as a video data series $D_C$ to the horizontal resolution processor 5. The line memory 2 may comprise an FIFO (First In First Out) memory which has a storage capacity of one horizontal scanning line (hereinafter designated as one H-line) of the video data and is capable of writing and reading simultaneously and independently.

The horizontal resolution processor 5 generates a video data series $D_{CH}$ with the increased resolution in the horizontal direction, by performing interpolation processing to the video data series $D_C$ sampled at the sampling frequency converter 1. The horizontal resolution processor 5 then supplies the data series $D_{CH}$ to the vertical resolution processor 6.

In the vertical resolution processor 6, a line memory 7 delays the stored video data series $D_{CH}$ by the time corresponding to one H-line to supply the delayed video data series as a delayed video data series $DD_{CH}$. In this time, the line memory 7 may comprise a FIFO memory having a capacity of storing one H-line of video data in the video data series $D_{CH}$.

A mixer 9 comprises a first multiplier for multiplying the video data series $D_{CH}$ directly supplied from the horizontal resolution processor 5 by coefficient $K_1$, a second multiplier for multiplying the video data series $DD_{CH}$ by coefficient $(1 K_1)$, and an adder for adding the outputs of the first and second multipliers to obtain one line of first interpolating video data. The mixer 9 obtains one H-line of first video data series $D_{HV1}$, by the following operation using the video data series $D_{CH}$, the delayed video data series $DD_{CH}$, and a coefficient $K_1$. Then, the mixer 9 supplies the first video data series $D_{HV1}$, to a frame memory 11.

$$D_{HV1}=D_{CH} \cdot K_1+DD_{CH} (1-K_1)$$

A mixer 10 has a similar configuration to that of the mixer 9. The mixer 10 obtains one H-line of second video data series $D_{HV2}$, by the following operation using the video data series $D_{CH}$, the delayed video data series $DD_{CH}$ and a coefficient $K_2$. Then, the mixer 10 supplies the second video data series $D_{HV2}$ to the frame memory 11.

$$D_{HV2}=D_{CH} \cdot K_2+DD_{CH} (1-K_2)$$

Wherein the above coefficients $K_1$ and $K_2$ are values depending on the degree of changes in the resolution. The coefficients are generated in the resolution processing controller 15 respectively. In this manner, two outputs are provided from a mixer.

With the above-mentioned configuration, the vertical resolution processor 6 generates two new H-lines of video data series ($D_{HV1}$, $D_{HV2}$), by using one H-line of video data series in the video data series $D_{CH}$ and another H-line of video data series just before the former H-line of video data series. This operation produces a video data series having twice as many horizontal scanning lines as the original video data series D, thus increasing the vertical resolution.

The first video data series $D_{HV1}$ and the second video data series $D_{HV2}$ are alternately stored into the frame memory 11. From the frame memory 11 the stored video data are sequentially read out and supplied as a high-definition video data series DH to a matrix type display unit 14 such as a plasma display panel. One screen of a display unit 14 is formed with n rows and m columns (n·m) pixels. In this case, the number of rows, n, indicates the vertical resolution and the number of columns, m, indicates the horizontal resolution. Each of them corresponds to the resolution of the high-definition video data series DH.

As described above, the resolution processor shown in FIG. 1 increases the resolution in the horizontal direction by performing the interpolation processing to the received video data series. And, the resolution processor doubles the resolution in the vertical direction by generating two H-lines of video data from one H-line of video data.

It is also possible to provide three or more mixer and data line pairs for one input. For example, when three pairs of mixer and data line are provided for one input, three output are available for one input, enabling a threefold increase of the resolution in the longitudinal direction (vertical direction).

For instance, in order to increase a video signal with pixels of 640 (horizontal)×480 (vertical) by three times in both the horizontal and vertical directions, the above configuration requires the line memory 2 to have the capacity for 640 pixels, and the line memory 7 to have a capacity for 1920 pixels. That is, a total of 2560 pixels are required, because the above configuration performs the vertical increasing process after the horizontal increasing process.

In this case, the number of data lines required equals the desired increasing power, namely three data lines and six multipliers in total are necessary in a mixer.

However, the conventional circuit configuration has had a problem in that, changing the resolution requires as many mixers, each having a complicated configuration, as the desired magnification of the vertical resolution.

The present invention has been made in consideration of the above problems, and provides a video signal processor which can freely change a scaling power of the resolution without modifying the circuit configuration.

OBJECTS AND SUMMARY OF THE INVENTION

The present invention is characterized in that a video signal processor comprises a plurality of line memories, each of which stores one horizontal scanning line of video data series, a controller for controlling the plurality of line memories for sequentially storing every horizontal scanning line of video data series in one of the plurality of line memories, and reading the stored data from the plurality of line memories, and an arithmetical unit for receiving two video data series from two of the plurality of line memories and generating one new horizontal scanning line of video data series based on the received video data series. The controller further includes means for selecting a vertical scaling power of the resolution and means for generating a horizontal scanning synchronizing signal having a period depending on the selected scaling power. In the above configuration, the arithmetical unit is triggered by the horizontal scanning synchronizing signal to generate the new horizontal scanning line of video data series.

A video signal processor according to the present invention can increase and decrease the resolution of an image constituted by video data series depending on any value of a scaling power. That is, the vertical resolution of one frame of the image being displayed can be changed to any scaling power.

BRIEF DESCRIPTION OF THE DRAWINGS

The aforementioned aspects and other features of the invention are explained in the following description, taken in connection with the accompanying drawing figures wherein:

FIGS. 3A–3R are waveform diagrams illustrating a signal appearing at each part of the video signal processor shown in FIG. 2 when the resolution is magnified, and FIGS. 4A–4R are waveform diagrams illustrating a signal appearing at each part of the video signal processor shown in FIG. 2 when the resolution is reduced.

DETAILED DESCRIPTION OF THE PREFERRED EMBODIMENTS

Figure 1:
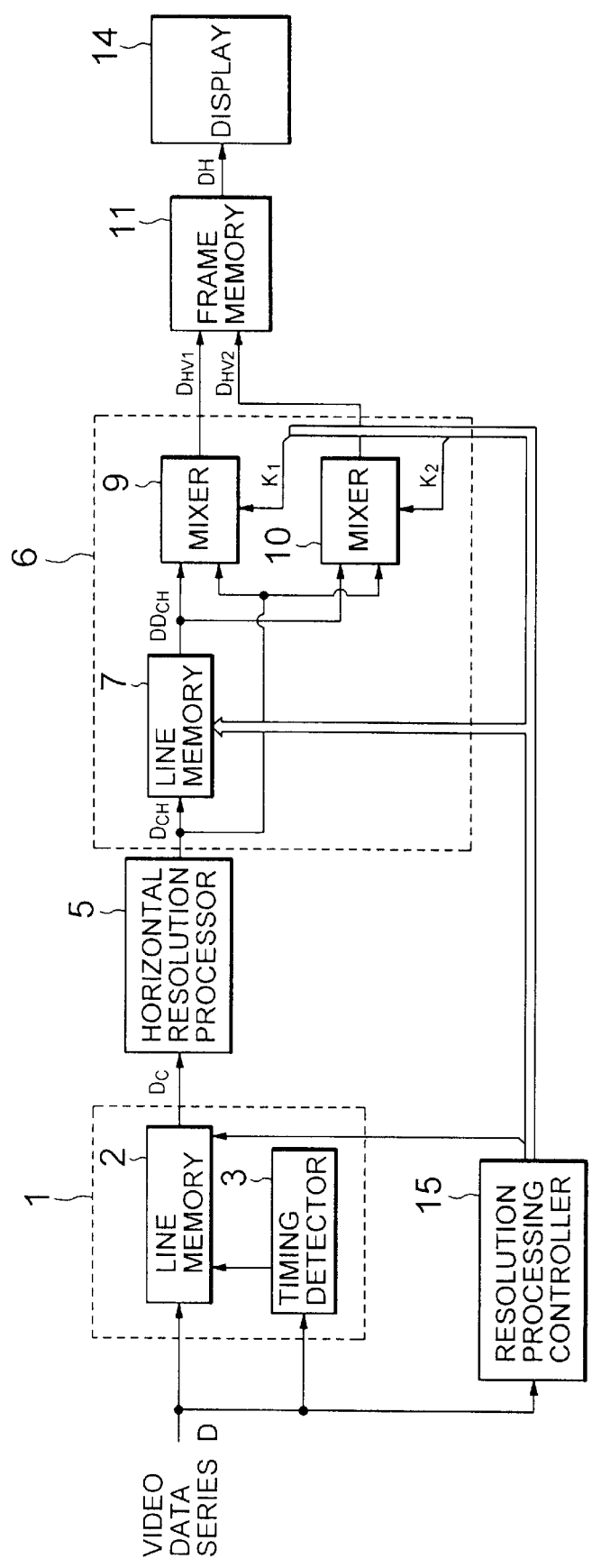
FIG. 1 is a block diagram showing a conventional video signal processor.

A preferred embodiment of an apparatus having three line memories according to the present invention will be described, referring to the drawings.

Figure 2:
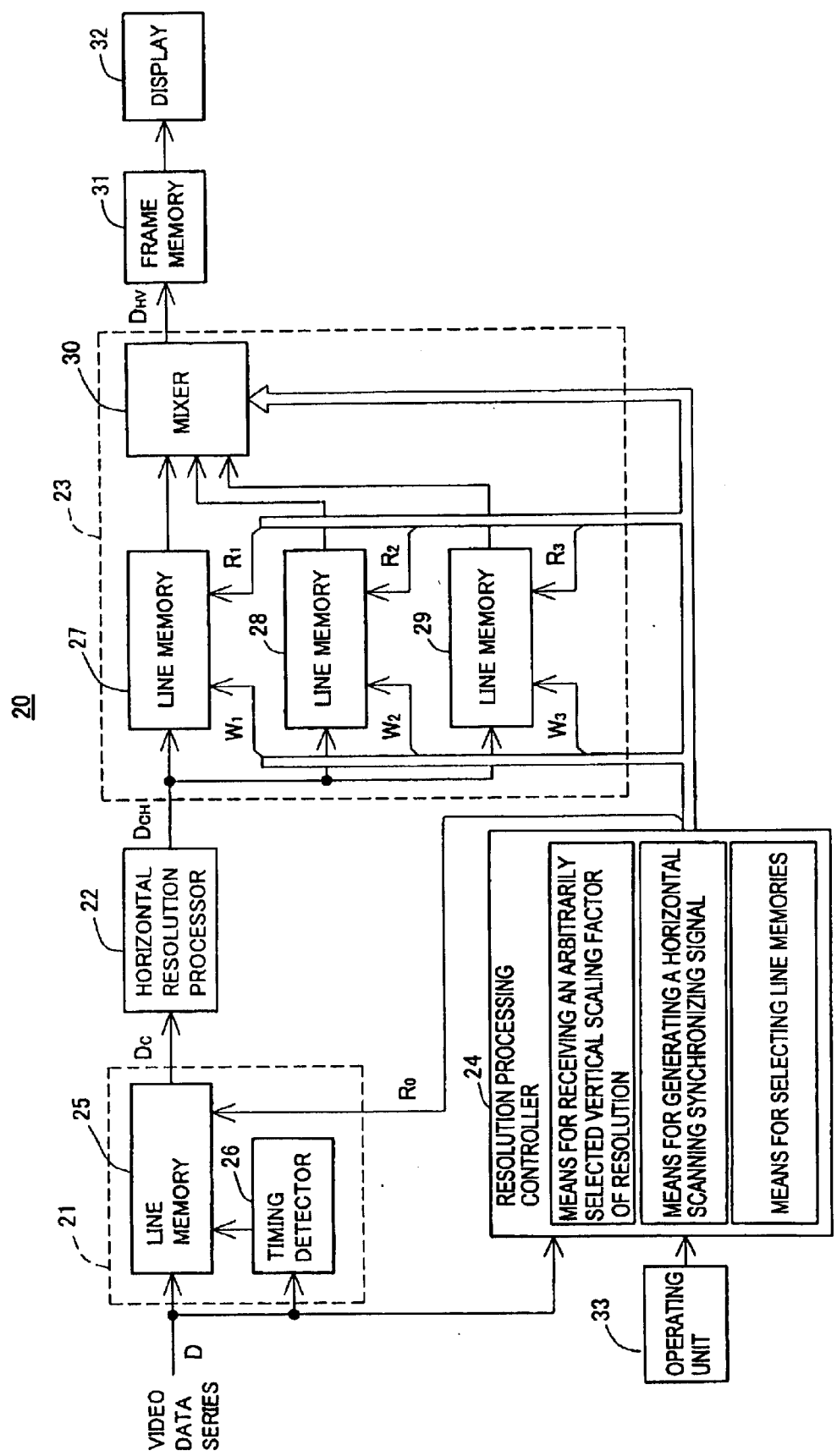
FIG. 2 is a block diagram showing an embodiment of a video signal processor according to the present invention.

FIG. 2 is a block diagram showing a resolution processor as an embodiment of a video signal processor according to the present invention.

In FIG. 2, the resolution processor 20 comprises a sampling circuit 21, a horizontal resolution processor 22, a vertical resolution processor 23, and a resolution processing controller 24.

The sampling circuit 21 comprises a line memory 25 and a timing detector 26. The timing detector 26 receives an video data series D comprising, for example, 8-bit video data, and detects a sampling timing for every scanning horizontal line (designated as one H-line hereinafter) from the received video data series. Then, the timing detector supplies a write signal to the line memory 25 based on the detected timing. The line memory 25 sequentially receives the video data in the video data series D in response to the write signal. The line memory 25 supplies the stored video data series D in the stored order in response to a read signal $R_0$ supplied from the resolution processing controller 24. Then, the data series D is supplied to the horizontal resolution processor 22 as a video data series $D_C$. The line memory 25 may be a FIFO (First In First Out) memory having a storage capacity of one H-line of video data series and being capable of writing and reading the data simultaneously and independently.

The horizontal resolution processor 22 generates a video data series $D_{CH}$ with the changed horizontal resolution, by interpolating the video data series $D_C$ for increasing the resolution, or by thinning the video data series $D_C$ for decreasing the resolution. Then, the processor 22 supplies the video data series $D_{CH}$ to the vertical resolution processor 23.

The vertical resolution processor 23 changes a vertical resolution of the video data series $D_{CH}$ dependently on a selected scaling power, i.e., an increasing/decreasing power of the resolution. The vertical resolution processor 23 comprises three line memories 27, 28 and 29 and a mixer 30 as an arithmetical unit. The line memories 27, 28 and 29 have a capacity of storing video data in one H-line of the video data series $D_{CH}$ having the horizontally increased resolution. The line memories may be FIFO memories capable of writing and reading data independently and simultaneously. The line memories 27, 28 and 29 receive and store the video data series $D_{CH}$ in response to the respective write signals $W_1$, $W_2$ and $W_3$ supplied from the resolution processing controller 24. The line memories supply the stored video data series to the mixer 30 in response to the respective read signals $R_1$, $R_2$ and $R_3$ supplied from the controller 24.

The mixer 30 is capable of receiving a video data series $D_{CH}$ from each of two line memories simultaneously. The mixer 30 comprises a first multiplier for multiplying one H-line of video data series $D_{CH1}$ from one of the line memories by a coefficient $K_i$, a second multiplier for multiplying one H-line of video data series $D_{CH2}$ from the other line memory by a coefficient $(1-K_i)$, and an adder for adding outputs of the first and second multipliers to generate new video data. That is, the mixer 30 combines two video data series $D_{CH1}$ and $D_{CH2}$ supplied from two line memories together, using the following equation (1) and a coefficient $K_i$, supplied from the controller 24 to obtain one H-line of video data series $D_{HV}$, which is supplied to a frame memory 31.

$$D_{HV} = D_{CH1} \cdot K_i + D_{CH2} (1-K_i) \tag{1}$$

wherein the coefficient $K_i$ is a value which the controller 24 determines dependent on a scaling factor, i.e., an increasing/decreasing power of the resolution. Accordingly, the mixer 30 can generate plural lines of video data series corresponding to the number of new horizontal scanning lines being inserted between the existing horizontal lines of video data, only by changing the coefficient $K_i$ for the original video data series.

The above configuration enables the vertical resolution processor 23 to generate a new video data series, using one H-line of a video data series and the next previous H-line of video data series. Thus, one H-line of video data series with the changed vertical resolution can be obtained.

The frame memory 31 receives and stores the video data series $D_{HV}$ supplied from the mixer 30 and reads out the stored video data sequentially. Then, the read data is supplied to a matrix type of display unit 32 such as a plasma display panel.

The display unit 32 has a screen composed of a matrix of (n·m) pixels. In the display unit 32, the row number, n, indicates the vertical resolution and the column number, m, indicates the horizontal resolution. Each of them corresponds to the resolution in the high-definition video data series $D_H$.

The resolution processing controller 24 controls the sampling circuit 21, the horizontal resolution processor 22 and the vertical resolution processor 23. The resolution processing controller 24 supplies a read signal to the line memory 25 and supplies write and read signals to the line memories 27, 28 and 29. The resolution processing controller 24 also generates an arithmetic coefficient based on an increasing/decreasing ratio of the resolution to supply the generated coefficient to the mixer 30. An operating unit 33 is connected to the resolution processing controller 24. The operating unit 33 enables users to input a vertical resolution scaling factor, that is, the ratio to increase or decrease the number of horizontal scanning lines. According to the present invention, the vertical scaling factor can be any real number.

The operation of the resolution processor in FIG. 2 will now be described, referring to FIGS. 3A–3R. As an example, the operation will be described where the number of horizontal scanning lines of video data increases 1.5 times.

As shown in FIGS. 3A–3R, the timing detector 26 detects a sampling timing indicating a break of one horizontal scanning line of video data series D which the resolution processor receives (See FIG. 3A). With the sampling timing, every one H-line of a video data series is stored in the line memory 25, and then supplied to the horizontal resolution processor 22 sequentially.

The horizontal resolution processor 22 increases the horizontal resolution of the data series $D_C$ supplied from the sampling circuit 1, and supplies the data series $D_C$ having the increased resolution as a video data series $D_{CH}$ to the vertical resolution processor 23 (See FIG. 3B).

Meanwhile, the resolution processing controller 24 supplies write signals $W_1$, $W_2$ and $W_3$ to the corresponding line memories 27, 28 and 29 to cause the respective line memories 27, 28 and 29 to receive the data therein (See FIGS. 3C, 3D, 3E). Each of the write signals $W_1$, $W_2$ and $W_3$ has the same duration as that of the detected timing pulse, and contains the same number of clock pulses as the number of pixels to constitute one H-line of video data. That is, the write signals $W_1$, $W_2$ and $W_3$ are capable of writing one H-line of video data series $D_{CH}$ into memories. The write signals $W_1$, $W_2$ and $W_3$ enables the video data series to be written into the line memories 27, 28 and 29 sequentially.

In the line memory receiving the write signal $W_i$ (i=1, 2, 3), a video data series $D_{CH}$ is stored synchronizing with the write signal $W_i$. For example, when the write signal $W_1$ at the time $t_0$ causes the line memory 27 to start the storing process, a data series Dn is sequentially stored in only the line memory 27 (See FIG. 3F).

When the storing of the data series into the line memory 27 is completed at the time $t_1$, and the write signal $W_2$ simultaneously causes the line memory 28 to start the storing, a data series $D_{n+1}$ is sequentially stored into only the line memory 28 (See FIG. 3G). Similarly, when the storing of the data series into the line memory 28 is completed at the time $t_2$ and simultaneous the storing of the data series into the line memory 29 is started by the write signal $W_3$, a data series $D_{n+2}$ is stored sequentially into only the line memory 29 (See FIG. 3H). In this manner, every one H-line of video data series is stored into the memories 27, 28 and 29 sequentially.

In order to achieve the increasing power of 1.5 times, the resolution processing controller 24 generates a horizontal scanning synchronizing signal S having a period (1/1.5) times the period of a sampling timing detected at the timing detector 26 (See FIG. 3I). The resolution processing controller 24 further generates read signals $R_1$, $R_2$ and $R_3$ for the line memories 27, 28 and 29 based on the horizontal scanning synchronizing signal (See FIGS. 3J, 3K, 3L). The read signals have the same duration as the period of a horizontal scanning synchronizing signal, and comprise a plurality of clock pulses each of which enable a reading of one H-line of data within one duration. The resolution processing controller 24 is triggered by the horizontal scanning synchronizing signal to send a read signal to each of two line memories where writing of video data is not being done at that moment. The resolution processing controller 24 also generates coefficients of arithmetic operation $K_1$, $K_2$ and $K_0$ and supplies the generated coefficients to the mixer 30 in order at the same interval as the period of the horizontal scanning synchronizing signal (See FIG. 3P).

Accordingly, at the time $t_2$, for example, as a data series $D_{n+2}$ is being stored in the line memory 29 (See FIG. 3H), the resolution processing controller 24 sends read signals $R_1$ and $R_2$ to each of the line memories 27 and 28 (See FIGS. 3J, 3K). Synchronizing with the read signals $R_1$ and $R_2$, the data series $D_n$ and $D_{n+1}$ are read out simultaneously from the two memories 27 and 28 respectively, and supplied to the mixer 30 (See FIGS. 3M, 3N). That is, the memories 27 and 28 receive the read signals at the time $t_2$, then, one data series $D_n$ is read out as a first data series $D_{CH1}$ from the memory 27, and the other data series $D_{n+1}$ is read out as a second data series $D_{CH2}$ from the memory 28.

The mixer 30 combines two data series $D_n$, $D_{n+1}$ by the equation (1) and a coefficient $K_2$ supplied from the controller 24 to generate one H-line of new video data series $D_N'$ thereby supplying the new video data series to the frame memory 31 (See FIG. 3Q).

At the time $t_3$, simultaneous with the completion of generation of the data series $D_n'$, the next horizontal scanning synchronizing signal is generated. Since a data series $D_{n+2}$ is being stored in the line memory 29 at this time (See FIG. 3H), read signals $R_1$, and $R_2$ are sent to the memories 27 and 28 again (See FIGS. 3J, 3K). With these read signals, the video data series $D_n$ and $D_{n+1}$ are read out from the memories 27 and 28 again (See FIGS. 3M, 3N), and these data series are combined together in the mixer 30. The coefficient used in the equation (1) for the combination at this time is, however, the coefficient newly sent from the controller 24. That is, the coefficient $K_1$ is different from the former coefficient $K_2$ (See FIG. 3P). Using this coefficient $K_1$, one H-line of video data series $D_n''$, different from the former one H-line of video data series, is generated and supplied to the frame memory 31 (See FIG. 3Q).

Furthermore at the time $t_4$, another horizontal scanning synchronizing signal is generated simultaneously with completion of generating a data series $D_n$". At the time $t_4$, when a data series $D_{n+3}$ is being stored in the line memory 27 (See FIG. 3F), the resolution processing controller 24 sends read signals $R_2$ and $R_3$ to the memories 28 and 29 (See FIGS. 3K, 3L). With these read signals, the data series $D_{n+1}$ and $D_{n+2}$ are read out from the memories 28 and 29 (See FIGS. 3N, 3O), and then is combined in the mixer 30. The coefficient used in the equation (1) for the combination is $K_0$ (See FIG. 3P). Accordingly, a new H-line of video data series $D_{n+1}'$ is generated and supplied to the frame memory 31 (See FIG. 3Q).

As described above, the horizontal scanning synchronizing signal is generated at the time interval corresponding to the increased resolution power. The data series stored in two line memories are read out with the corresponding read signals in response to the horizontal scanning synchronizing signal, thereby generating a new H-line of video data series. Thus, a video data series with the increased resolution power of 1.5 times can be generated in a time divisional manner.

Consequently, one H-line of video data for one frame having 1.5 times as many horizontal scanning lines to the original video data are available. Therefore, any image on the display 32 can be displayed in a state in which the horizontal resolution is increased.

The operation of the resolution processor in FIG. 2 will now be described referring to FIGS. 4A–4R. Another embodiment is given where the total number of horizontal scanning lines of image being displayed is decreased by 0.75 times.

As shown in FIGS. 4A–4R, the timing detector 26 detects a sampling timing indicative of a break of one horizontal scanning line from the video data series D supplied to the resolution processor (See FIG. 4A). According to the sampling timing, every H-line of video data series is stored in the line memory, then is sent sequentially to the horizontal resolution processor 22.

The horizontal resolution processor 22 reduces the horizontal resolution of the data series $D_C$ supplied from the sampling circuit 1, and supplies the resultant data series as a video data series $D_{CH}$ to the vertical resolution processor 23 (See FIG. 4B).

Meanwhile, the resolution processing controller 24 supplies to each of the line memories 27, 28 and 29 a corresponding write signal $W_1$, $W_2$ and $W_3$ to instruct the respective memories to store data therein (See FIGS. 4C, 4D, and 4E). The write signals $W_1$, $W_2$ and $W_3$ have the same duration as that of the detected timing pulses, and comprise the same number of clock pulses as the total number of pixels forming one H-line of video data. The write signals $W_1$, $W_2$ and $W_3$ are for writing one H-line of video data series into a memory. By the write signals $W_1$, $W_2$ and $W_3$, the video data series is stored in the line memories 27, 28 and 29 sequentially.

In the line memory receiving the write signal $W_i$ (i=1, 2, 3), the video data series $D_{CH}$ is stored synchronizing with the write signal $W_i$. For example, when storing into the line memory 27 is started by the write signal $W_1$ at the time $t_0$, the data series $D_n$ is stored sequentially into only the line memory 27 (See FIG. 4F). At the time $t_1$, when the storing into the line memory 27 is completed, and simultaneously the storing into the line memory 28 is started by the write signal $W_2$, the data series $D_{n+1}$ is stored sequentially into only the line memory 28 (See FIG. 4G). Furthermore, at the time $t_2$, when storing into the line memory 28 is completed, and storing into the line memory 29 is started by the write signal $W_3$ simultaneously, a data series $D_{n+2}$ is stored sequentially into only the line memory 29 (See FIG. 4H). In this manner, every H-line of video data series is stored into the memories 27, 28 and 29 sequentially.

Meanwhile, in order to achieve the decreasing ratio of 0.75 times, the resolution processing controller 24 generates a horizontal scanning synchronizing signal S having a period of (1/0.75) times that of the sampling timing detected at the timing detector 26 (See FIG. 4I). The resolution processing controller 24 further generates read signals $R_1$, $R_2$ and $R_3$ for the line memories 27, 28 and 29 according to the horizontal scanning synchronizing signal (See FIGS. 4J, 4K, and 4L). The read signal has the same duration as the period of a horizontal scanning synchronizing signal, and comprises a plurality of clock pulses enabling sequential reading of one H-line of data within one duration. In addition, the resolution processing controller 24 sends a read signal to each of two line memories which can start reading of the stored video data, triggered by the horizontal scanning synchronizing signal. The resolution processing controller 24 also generates coefficients of arithmetic operation $K_0$, $K_1$ and $K_2$, and supplies the generated coefficients in turn to the mixer 30 at the same interval as the period of the horizontal scanning synchronizing signal (See FIG. 4P).

Accordingly, at the time $t_2$, for example, as a data series $D_{n+2}$ is being stored into the line memory 29 (See FIG. 4H), the resolution processing controller 24 sends read signals $R_1$ and $R_2$ to each of the line memories 27 and 28 (See FIGS. 4J, 4K). Synchronizing with the read signals $R_1$ and $R_2$, the data series $D_n$ and $D_{n+1}$ are simultaneously read out from two memories 27 and 28, respectively, and supplied to the mixer 30 (See FIGS. 4M, 4N). That is, at the time $t_2$, in the memories 27 and 28 receiving the read signals, one of data series $D_n$ is read out as a first data series $D_{CH1}$ from the memory 27, and the other data series $D_{n+1}$ is read out as a second data series $D_{CH2}$ from the memory 28.

At the mixer 30, the combining operation is performed using two data series $D_n$, $D_{n+1}$ and a coefficient $K_2$ supplied from the controller 24 to generate a new H-line of video data series $D_n'$. The video data series $D_n'$ is supplied to the frame memory 31 (See FIG. 4Q).

At the time $t_3$, simultaneously with the completion of generating data series $D_n'$, the next horizontal scanning synchronizing signal is generated. As a data series $D_{n+3}$ is being stored in the line memory 27 at this moment (See FIG. 4F), the read signals $R_2$ and $R_3$ are sent to the memories 28 and 29 (See FIGS. 4K, 4L). With the read signals, the video data series $D_{n+1}$ and $D_{n+2}$ are read out from the memories 28 and 29 (See FIGS. 4N, 4O). The data series is then combined in the mixer 30. The coefficient in the equation (1) used for the combining operation is $K_1$, which is a new coefficient supplied from the controller 24 and different from the former coefficient $K_2$ (See FIG. 4P). Using the coefficient $K_1$, a H-line of video data series $D_{n+1}'$, which is different from the former video data series, is generated and supplied to the frame memory 31 (See FIG. 4Q).

Furthermore at the time $t_4$, concurrent with the completion of generating the data series $D_{n+1}'$, another horizontal scanning synchronizing signal is generated. As a new data series $D_{n+4}$ is being stored in the line memory 28 at the time $t_4$ (See FIG. 4G), the resolution processing controller 24 sends read signals $R_1$ and $R_3$ to the memories 27 and 29 (See FIGS. 4J, 4L). With these read signals, the data series $D_{n+3}$ and $D_{n+2}$ are read out from the memories 27 and 29 (See FIGS. 4M, 4O), and then the data series is combined in the mixer 30. The coefficient in the equation (1) used for the combining operation is coefficient $K_0$ (See FIG. 4P). Accordingly, a new H-line of video data series $D_{n+2}'$ is generated and supplied to the frame memory 31 (See FIG. 4Q).

As described above, the horizontal scanning synchronizing signal having a period corresponding to a decreasing ratio is generated. As the reading signal is triggered by the horizontal scanning synchronizing signal, the data series stored in the memories are read out by the read signals, thereby generating a new H-line of video data series. Thus, the video data series with resolution decreased by 0.75 times can be consecutively generated in a time division manner.

Consequently, it is possible to obtain one new frame of video data with the decreased number of horizontal scanning lines by 0.75 times from the original frame of video data, enabling the video data to be displayed on the display 32 with the decreased horizontal resolution.

In the embodiments described above, the apparatus uses three line memories. The configuration of the apparatus, however, is not limited to the above embodiment, but the apparatus may include only two line memories. In this embodiment, the apparatus can perform the same function as that in the above embodiments by shifting the timing for reading out data from the line memories.

When new video data are generated in the mixer, a coefficient supplied from the resolution processing controller 24 is used. It should be noted that the number of coefficients required to change the resolution depends on increasing or decreasing ratio of the resolution. That is, in the embodiments described above, three coefficients $K_0$, $K_1$ and $K_2$ are used for generating three new H-lines of data from two existing lines of data in order to increase the resolution by 1.5 times. When the resolution is decreased by 0.75 times, three coefficients $K_0$, $K_1$ and $K_2$ are used for generating three new H-lines of data from four existing H-lines of data. However, when the resolution is increased by 1.25 times, for example, five coefficients are necessary for generating five H-lines of data from four lines of data.

In this manner, according to the present invention, it is possible to freely generate a number of lines of video data series from a received H-line of video data series without changing the circuit configuration. Consequently, the vertical resolution of one frame of received image can be changed freely.

In the foregoing, the present invention has been described with reference to the preferred embodiments thereof. It should be understood by those skilled in the art that various variations and modifications may be made without departing from the invention. Thus, such variations and modifications are intended to fall within the scope of the appended claims.

What is claimed is:

1. A video signal processor comprising:
   a plurality of line memories, each of which can store one horizontal scanning line of video data series;
   a controller for causing said plurality of line memories to sequentially store every horizontal scanning line of a video data series in one of said plurality of line memories, and to output the stored data from said plurality of line memories; and
   an arithmetical unit for receiving two video data series output from two of said plurality of line memories and generating one new horizontal scanning line of video data series based on the received video data series,
   wherein said controller comprises:
      means for receiving an arbitrarily selected vertical scaling factor of resolution from a source outside of said controller,
      means for generating a horizontal scanning synchronizing signal having a period depending on the selected scaling factor, and
      means for selecting two line memories from said plurality of line memories every time when said one new horizontal scanning line of video data series is generated to cause the selected two line memories to output two video data series stored therein, and
   wherein said arithmetical unit is triggered by said horizontal scanning synchronizing signal to generate said new horizontal scanning line of video data series.

2. A video signal processing according to claim 1, wherein said horizontal scanning synchronizing signal has a period of the reciprocal of the selected vertical scaling factor based on a time interval at which said horizontal scanning line of video data series is received.

* * * * *